United States Patent
Milbourne

(10) Patent No.: US 6,692,628 B2
(45) Date of Patent: Feb. 17, 2004

(54) PROCESS TO REMOVE FERRIC IRON IMPURITIES FROM AN ACIDIC AQUEOUS SOLUTION USED IN THE ELECTRO-WINNING OF COPPER

(75) Inventor: Joseph Charles Milbourne, Kingwood, TX (US)

(73) Assignee: SBR Ventures, LLC, Aurora, CO (US)

( * ) Notice: Subject to any disclaimer, the term of this patent is extended or adjusted under 35 U.S.C. 154(b) by 28 days.

(21) Appl. No.: 10/122,194

(22) Filed: Apr. 16, 2002

(65) Prior Publication Data

US 2002/0175083 A1 Nov. 28, 2002

Related U.S. Application Data

(60) Provisional application No. 60/284,055, filed on Apr. 17, 2001.

(51) Int. Cl.[7] ............................................. C25D 21/22
(52) U.S. Cl. ..................... 205/99; 205/574; 205/586; 210/660; 210/663; 210/665; 210/688
(58) Field of Search .................. 205/99, 574, 586; 210/660, 663, 665, 688

(56) References Cited

U.S. PATENT DOCUMENTS

| | | | |
|---|---|---|---|
| 2,738,322 A | | 3/1956 | Bauman et al. |
| 5,578,217 A | * | 11/1996 | Unger et al. ................ 210/688 |
| 5,582,737 A | | 12/1996 | Gula et al. |
| 5,603,839 A | | 2/1997 | Cameron |
| 5,948,264 A | | 9/1999 | Dreisinger et al. |
| 6,232,353 B1 | | 5/2001 | Alexandratos et al. |

* cited by examiner

*Primary Examiner*—Robert R. Koehler
(74) *Attorney, Agent, or Firm*—Larson & Taylor, PLC

(57) ABSTRACT

A process for the removal of primarily iron impurities from acidic aqueous electrolytic solutions used in the electrowinning of copper is described. Strong base Type 1 ion exchange resin is used to remove acid from the solution resulting in a treated solution that contains only a small amount of the original acid but all of the dissolved salts. This low acid treated solution is then processed using standard processes such as adjustment of the pH or oxidation potential to remove the iron impurities and the solution containing valuable process cobalt is returned to the electrolyte solution to continue the extraction of copper.

16 Claims, 3 Drawing Sheets

PROCESS TO REMOVE FERRIC IRON IMPURITIES FROM AN ACIDIC AQUEOUS SOLUTION USED IN THE ELECTRO-WINNING OF COPPER

This application claims priority under 37 C.F.R. 119(e) from Provisional Application Serial No. 60/284,055 filed Apr. 17, 2001.

The present invention relates to the removal of ferric iron and other impurities from copper electrolyte solution used in the electro-winning of copper or other acidic aqueous solutions containing metal ions.

Copper metal is produced from copper-bearing ore using several well-known processes. One of the most commonly used processes is referred to as heap leaching. In this process dilute sulfuric acid is passed over copper-bearing ore that has been placed atop an impermeable liner. As the dilute sulfuric acid solution percolates through the copper-bearing ore, copper and other impurities are leached from the ore. This solution, referred to a pregnant leach solution or PLS, is collected atop the impervious liner and is routed to a processing facility to recover the copper and return a copper-depleted solution for subsequent leaching.

Copper is recovered from the PLS using a multi-step process called solvent extraction and electro-winning (SX-EW). In the first step, copper ions are extracted from PLS using a kerosene-type solvent mixture. The copper depleted PLS is then returned to the heap leach for additional leaching. Copper is then stripped from the solvent mixture using a copper sulfate-sulfuric acid mixture ($CuSO_4$—$H_2SO_4$). The final step of the process is electroplating copper from the copper-enriched solution of the copper sulfate-sulfuric acid mixture.

Small amounts of iron are commonly transferred with the copper to the electroplating solution. Iron is either chemically co-extracted with the solvent or is mechanically introduced as entrainment of the aqueous solution from the stripping. As copper is plated out of solution, the iron content in the electrolyte increases. The build-up of iron in the electro-winning solution results in a decrease in the current efficiency due to continuous oxidation and reduction of iron ($Fe^{++}/Fe^{+++}$). Operating conditions of the copper electro-winning circuit are such that iron cannot be reduced to metal at the cathode; hence iron remains in the system. The loss of current efficiency can amount to 1–3% per gram of iron per liter of electrolyte. Normal plant practice to control iron in the electrolyte is to occasionally bleed iron rich copper electrolyte and replace it with sulfuric acid electrolyte.

The copper electro-winning process uses lead-alloy anodes. Soluble cobalt is added to the electrolyte (40–250 ppm) to minimize corrosion of the anodes and to prevent lead contamination of the copper metal plated at cathode. During the bleed of the electrolyte to control iron, cobalt is therefore lost and fresh cobalt must be added to the electro-winning electrolyte to maintain the needed level to minimize corrosion of the anode. Replenishing of cobalt to the electrolyte is a major operating expense in copper SX-EW operations. A method of removing iron from electro-winning electrolyte without removing cobalt has long been desired.

The following patents provide proposals for the selective removal of iron from an acidic solution; but none has provided a satisfactory method which is suitable for use in the removal of impurities from a process of electro-winning of copper.

Gula et al in U.S. Pat. No. 5,582,737 describe a process that selectively separates iron (III) from sulfuric acid solutions containing copper and cobalt using an ion exchange resin that contain gem-diphosphonic functional groups. The resin preferentially adsorbs iron (III) and copper and cobalt are returned to the electroplating solution. Loaded resin is regenerated using sulfurous acid ($H_2SO_3$) generated by aspirating $SO_2$ gas into water containing copper (I) ions. Sulfurous acid reduces the adsorbed iron (III) ions to iron (II) that are easily removed and discarded as a waste product.

Cameron in U.S. Pat. No. 5,603,839, describes a process for the recovery of waste sulfuric acid generated at industrial operations. An ion exchange resin is used to separate sulfuric acid from waste sulfuric acid. The patent teaches that the resin is regenerated with water to produce a acid-rich solution and a salt-rich solution. The acid-rich solution is then further concentrated with a multi-step evaporator to produce a concentrated acid-rich stream for recycle.

Dreisinger et al. in U.S. Pat. No. 5,948,264 describe an improved gem-diphosphonic resin regeneration process for the removal of iron (III) from aqueous metal ion containing sulfuric acid solutions. The patent teaches that increasing the temperature of the sulfurous acid to 65–95° C. improves the regeneration of the ion exchange media.

Bauman et al in U.S. Pat. No. 2,738,322 describe a process for removing sulfuric acid from aqueous solutions of inorganic sulfates using anionic exchange resin. They teach that any anionic exchange resin containing primary, secondary, or tertiary amino groups or quaternary ammonium groups may be employed in the process. Aqueous solutions of inorganic sulfates containing sulfuric acid are passed through a bed of anion exchange resin. Sulfuric acid is retained on the resin and the inorganic sulfate salts pass through. Sulfuric acid is then recovered from the anion exchange resin by washing the resin with water. The process can be operated at room temperature.

Alexander et al, U.S. Pat. No. 6,232,353, teach that by synthesizing an ion exchange resin with both sulfonic and diphosphonic acid functional groups the selectivity for iron (III) is improved over transition metal. Iron loaded resin. However, the resin must be regenerated with hot sulfuric acid solution containing Cu(I) solution. This is an improvement in the selectivity of the resin over the diphosphonic resin described by Dressinger, et al, U.S. Pat. No. 5,948,264.

BRIEF SUMMARY OF THE INVENTION

It is an object of the present invention to provide a method for electro-winning of copper n which impurities and particularly iron is removed.

According to the invention there is provided a method for the electro-winning of copper comprising:

providing electrodes in an electrolyte comprising a copper-enriched aqueous solution of a copper sulfate-sulfuric acid mixture containing iron (III) as an impurity and passing current therethrough to effect extraction of copper by electroplating of the copper from the electrolyte;

the extraction of the copper causing a relative build up in the level of the iron impurity in the electrolyte;

after extracting copper, removing at least a part of the electrolyte solution;

removing the iron (III) impurity from the aqueous sulfuric acid electrolyte solution containing the iron impurity by:

contacting the removed electrolyte solution with an anionic strong base solid ion exchange medium in which the medium binds the sulfuric acid in preference to the iron (III) ions to form a solid/liquid admixture, wherein the ion exchange medium is comprised of an insoluble cross-linked polymer having a plurality of quaternary amine groups (N::) as the exchanging group;

contacting the electrolyte solution with a sufficient amount of ion exchange particles for a time period required to solid phase-bind the sulfuric acid to leave an aqueous phase containing the iron impurity;

separating the solid and liquid phase;

extracting the iron impurity from the liquid phase;

removing the sulfuric acid from the solid ion exchange medium;

and returning at least part of the sulfuric acid and the liquid phase after extraction of the iron impurity to the electrolyte solution for further electrolytic plating of the copper.

Preferably the liquid phase is mixed an acid-neutralizing agent to raise the pH of the liquid phase to a value of at least 2.5 but less than 4.0, causing the iron (III) to form a solid phase iron hydroxide $(Fe(OH)_3)$ for separation therefrom.

Preferably the solid phase iron hydroxide is then separated from the liquid phase and the liquid phase is returned to the electrolyte solution for further copper extraction.

Preferably the acid neutralizing agent is sodium hydroxide solution.

Preferably the sulfuric acid is removed from the ion exchange medium by contacting the solid phase-bound sulfuric acid with water thereby forming an aqueous sulfuric acid solution and regenerating the ion exchange medium.

Preferably the aqueous sulfuric acid solution separated from the ion exchange resin is recycled back to the electrolyte solution.

Preferably the solid ion exchange medium is provided in the form of particles.

Preferably the solid ion exchange medium is comprised of a cross-linked copolymer ranging from 4% cross linked to 40% cross linked.

Preferably the solid ion exchange medium is comprised of a cross-linked copolymer with the preferred cross linking greater than 8%.

Preferably the solid ion exchange medium is comprised of a cross-linked copolymer present as spherical particles with a diameter of between 0.074 millimeters and 1.0 millimeters.

Preferably the solid ion exchange medium is comprised of a cross-linked copolymer with the preferred particle size less than 0.297 millimeters.

Preferably the concentration of sulfuric acid in the removed electrolyte solution is about 1 to 3 molar.

Preferably the removed electrolytic solution contains other metal ions from the group consisting of copper (II), manganese (II), cobalt (II) and iron (III).

Preferably the said aqueous solution of sulfuric acid forming the removed electrolytic solution also contains iron (II) and iron (III) ions.

Preferably the solid ion exchange medium is provided in a moving bed.

Preferably the electrolyte solution contains cobalt and the cobalt extracted with the removed electrolyte solution is returned to the electrolyte solution after the iron impurities are removed.

The present invention relates to an improved method for removing iron (III) from aqueous metal ion-containing sulfuric acid solutions using anionic strong base (SBR) ion exchange resin containing quaternary ammonium groups (N::) as the exchanging group.

Suitable strong base ion exchange resins are described in detail in United States patents set out hereinafter.

An improved ion exchange process is disclosed herein that avoids the use of gem-diphosphonic acid ion exchange resin and thereby negates the need for regeneration with copper (I) ions and the handling of sulfurous acid and $SO_2$. The process is based on the use of strong base resin (SBR) that has the ability to separate acid from mixtures of acids and salts such as the copper electrolyte solution.

An aqueous metal ion-containing sulfuric acid electrolyte solution that contains iron (III) ions as well as at least copper metal ion is contacted with solid ion exchange medium that is preferably in the form of particles. The ion exchange medium binds sulfuric acid in preference to the additional metal ions present to form a solid liquid admixture.

The preferred ion exchange medium is comprised of cross-linked copolymer ranging from 4% cross linked to 40% cross linked with the preferred cross linking greater than 8%, preferably present as spherical particles with a diameter of between 0.074 millimeters and 1.0 millimeters with the preferred particle size less than 0.297 millimeters and having a plurality of quaternary ammonium groups.

The contact is maintained between the sulfuric acid solution containing iron (III) ions and a sufficient amount of ion exchange particles for a time period required to solid phase-bound sulfuric acid and an aqueous phase containing the additional metal ions.

The solid and liquid phases are separated.

In one embodiment, the liquid phase containing iron (III) and the additional metals is contacted with a small amount of sodium hydroxide or other base to raise the pH above pH 2.5 preferably pH 3 causing the iron (III) to precipitate as ferric hydroxide $(Fe(OH)_3)$ solid.

In another embodiment of the invention, hydrogen peroxide is added to the liquid phase and iron (II) is allowed to oxidize and hydrolyze as ferric hydroxide. In yet another embodiment, the acid-free solution of iron (III) and additional ions is returned to the heap leach process.

In another embodiment, the oxidation potential and the pH of the liquid phase are raised to precipitate manganese.

The ferric hydroxide solid is separated from the acid-free solution containing the additional metals using a filter. The solid ferric hydroxide is washed with water to recover entrained metal and the wash solution as well as the filtrate is returned to the process.

The ion exchange medium containing the bound sulfuric acid is rinsed with sufficient water, the preferred method being countercurrent, for a time period to form an admixture of solid phase-bound water and sulfuric acid.

The solid and liquid phases are separated.

The liquid phase containing sulfuric acid is returned to the process and solid phase defining the ion exchange particles is ready to be reused as described above.

DETAILED DESCRIPTION OF THE INVENTION

As noted above, the present invention contemplates the use of strong base ion exchange resin to selectively remove a majority of the sulfuric acid present from a solution containing both sulfuric acid and iron (III) as well as other metal ions including copper (II), cobalt (II), iron (II) and sometimes manganese (II). By removing sulfuric acid, the remaining solution containing most of the metal salts is then treated with conventional processes known to those in the water treatment industry to remove the iron and to return the treated solution back to the process.

This process contemplates the removal of iron (III) from a sulfuric acid solution 10 containing various metal sulfates including iron (III), iron (II), cobalt (II) and copper (II). The embodiment of this process contemplates the treatment of electrolytic solutions present in SX-EW processes.

One contemplated embodiment of this invention is an ion exchange and regeneration process for the removal of iron (III) ions from an aqueous metal ion-containing sulfuric acid solution. This process comprises the following steps:

(a) An aqueous sulfuric acid solution containing iron (III) and at least one other metal ion is contacted with solid ion exchange medium. The solid phase ion exchange medium binds the sulfuric acid in preference to the iron (III) ions and other metal ions to form a solid/liquid admixture.

The ion exchange medium is comprised of an insoluble cross-linked polymer having a plurality of quaternary amine groups.

(b) The contact between the sulfuric acid solution containing iron (III) and at least one other metal ion is and a sufficient amount of ion exchange particles for a time period required to solid phase-bound sulfuric acid and an aqueous phase containing the additional metal ions.

(c) The solid and liquid phases are separated.

(d) The liquid phase containing iron (III) and at least one other metal is mixed with sodium hydroxide solution or other acid-neutralizing agent to raise the pH of the liquid phase to a value of at least 2.5 but less than 4.0, causing the iron (III) to form a solid phase iron hydroxide ($Fe(OH)_3$). The solid phase iron hydroxide is then separated from the pH-adjusted solution and is returned to the copper electro-winning apparatus for further copper extraction.

(e) The solid phase-bound sulfuric acid is contacted with water thereby forming an aqueous sulfuric acid solution and regenerating the ion exchange resin. The sulfuric acid solution is separated from the ion exchange resin and are recycled back to the copper electro-winning apparatus.

Figure 1:
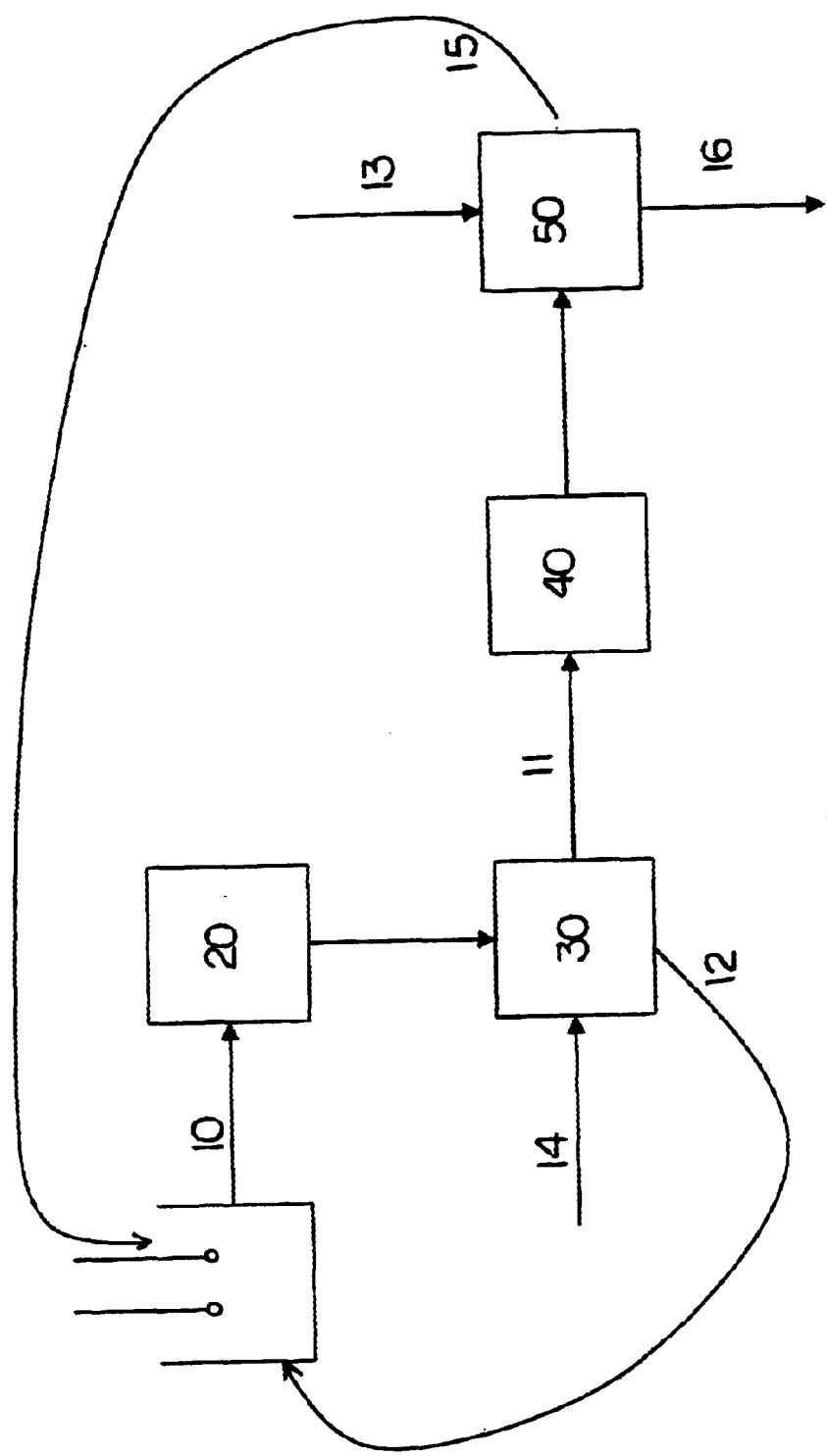
FIG. 1 shows a schematic of one embodiment of the process according to one embodiment of the present invention.

Referring to FIG. 1, a schematic for one embodiment of the process according to the present invention is shown The acid composition of the sulfuric acid stream 10, taken from the electro-winning process 1 containing the electrolyte solution 2 and the electrodes 3 and 4, varies from operation to operation however; the sulfuric acid composition may be from 1 to 50%. The concentration of metal sulfates in the sulfuric acid stream 10 will depend on where the sulfuric acid stream 10 is obtained. The concentration of the metal sulfates in the sulfuric acid stream 10 is less than the solubility limit for the metal sulfates in the sulfuric acid stream 10.

Stream 10 is fed to a holding tank 20. The holding tank acts as a reservoir for solution and insures a steady feed to the ion exchange apparatus, 30.

The sulfuric acid solution containing various metal sulfates is then fed to an ion exchange apparatus 30, which may be a fixed bed or moving bed arrangement as well known to one skilled in the art, containing strong base ion exchange resin such as those described in the following United States Patents, the disclosure of each of which is incorporated herein by reference:

U.S. Pat. No. 2,591,573 "Resinous Insoluble Reactions Products of Tertiary Amines with Haloalkylated Vinyl Aromatic Hydrocarbon Copolymers", Charles H. McBurney, Philadelphia, Pa., Assignor to Rohm & Haas, patented Apr. 1, 1952

U.S. Pat. No. 2,614,099 "Anion Exchange Resins", William C. Bauman and Robert McKellar, Midland, Mich., assignors to The Dow Chemical Company, Midland Mich., patented Oct. 14, 1952

U.S. Pat. No. 2,642,417 "Anion Exchange Resins from Tertiary Amines and Methyl Styrene Polymers", Elmer L. McMaster, Robert M. Wheaton and James Russel Skidmore, Midland Mich., assignors to The Dow Chemical Company, Midland, Mich., Patented Mar. 17, 1953

U.S. Pat. No. 2,788,331 issued ? to ?; "Anion Exchange Resin from cross-linked Halogenated Polyvinylaromatic Polymers", Albert H. Green, Westmont, N.J. and Martin E. Gillwood, Oceanside, N.Y., assignors to The Permutit Company, New York, N.Y., Patented Apr. 9, 1957

U.S. Pat. No. 2,960,480 "Production of Haloalkylated Resin Particles", Lawrence E. Thielen, Villa Park, Ill., assignor to Nalco Chemical Company, patented Nov. 15, 1960

U.S. Pat. No. 3,173,892 "Process of preparing Reaction Products of a Halomethylated Cross-linked Copolymer, and Resulting Product", Kenneth Kunn, Evergreen Park Manor, Pa., assignor to Rohm & Haas Company, Philadelphia, Pa., patented Mar. 16, 1965

U.S. Pat. No. 3,549,562 "Production of Ion Exchange Resin Particles", Morris Mindick, Chicago and Jerry J. Svarz, La Grange, Ill., assignors by mesne assignments, to The Dow Chemical Company, patented Dec. 22, 1970

U.S. Pat. No. 3,637,535 "Anion Exchanger with Sponge Structure", Herbert Corte, Leverkusen, Alfred Meyer, Cologne-Stamheim, both of Germany, Assignee: Farbenfabriken Bayer Aktiengesellschaft, Leverkusen, Germany. Patented Jan. 25, 1972

U.S. Pat. No. 4,221,871 "Recticular Crosslinked Monovinylidene N-heterocycicic Copolymer", Eric F. Meizner, Glenside and James A. Oline, Wyncote, both of Pennsylvania, assignors to: Rohm & Haas, patented Sep. 9, 1980

U.S. Pat. No. 4,235,972 "High crush Strength Heterogenous Ion Exchange Resins of Crosslinked Polymers Having Vinyl Halide Monomer Polymerized Herein", Griffin D. Jones, Midland, Mich., assigor to: The Dow Chemical Company, patented Nov. 25, 1980

U.S. Pat. No. 5,068255 "Ion Exchange Resin Prepared by Sequential Monomer Addition", William I. Harris, assignee: The Dow Chemical Company, patented Nov. 26, 1991 and U.S. Pat. No. 6,059,975 "Bifunctional Anion-Exchange Resins with Improved Selectivity and Exchange Kinetics", Spiro D. Alexandratos; Gilbert M. Brown; Peter V. Bonnesen, all of Knoxville: Bruce A. Moyer, Oak Ridge, all of Tenn., assignee: Lockheed Martin Energy Research Corporation, patented May 6, 2000

The ion exchange apparatus can be a fixed bed system where ion exchange resin is contained in a column or tank equipped with a feed distribution system and an effluent collection system or it can be a moving bed type such as the types described in the following United States Patents, the disclosure of each of which is incorporated herein by reference:

U.S. Pat. No. 2,815,322 "Counter-Current Liquid-Solid Mass Transfer Method and Apparatus", Irwin R. Higgins, Oak ridge, Tenn., Dec. 3, 1957

U.S. Pat. No. 4,293,423 "Process and Apparatus for Ion Exchange by use of Thermally Regenerable Resin", Kenji Kosaka, Mikata; Takeshi Iwatsuka, Funabashi; lkuo Shindo, Mikata; Akira Hotogi, Ichikawa; all of Japan, Assignee: Rohm & Haas, patented Oct. 6, 1981

U.S. Pat. No. 4,385,993 "Method and Apparatus for Folded Moving Bed Ion Exchange System", Harold N. Hendrick, Brandon, Solon G. Whitnet, Bartow, both of Florida, Assignee: American Petro Mart, Inc., patented May 31, 1983

U.S. Pat. No. 4,808,317 "Process for Continuous Contacting of Fluids and Solids", W. Wes Berry, Lakeland, Fla.; Rae A. Schmeda, Littleton; Holly S. Kibler, Boulder, both of Colorado, Assignee: Advanced Separation Technologies Incorporated, patented Feb. 28, 1989

U.S. Pat. No. 5,580,445 "Continuous Ion Exchange Appratus", Takeshi lwatsuka; Kazuhiko Shimizu, both of Toda, Japan; Assignee: Organo Corporation, Tokoyo, Japan, patented Dec. 3, 1996 and U.S. Pat. No. 6,334,956 "Adsorption or Desorption of Dissolved Constituents in Liquids and Apparatus Therefor", Jan Hendrik Hanemaaijer, Oosterboock, NL, assignee: Nederlande Organisatic Voor Toegepast-Natuurwetenschappeljk Onderzoek (TNO), Delft (NL)

The amount of sulfuric acid solution 10 fed to the ion exchange apparatus 30 will depend on the amount of ion exchange resin in the ion exchange apparatus and the composition of the sulfuric acid solution 11. In the preferred embodiment, the sulfuric acid solution will typically contain between 10 and 15 weight % sulfuric acid, between 30 to about 50 grams of copper (II) per liter, 0–15 grams of iron (III) per liter or a mixture of iron (II) and iron (III). Cobalt (II) ions are normally present at a concentration of 0.1–0.5 grams per liter. Manganese (II) ions can be present at less than 0.01 to 0.5 grams per liter.

Normally, the ion exchange resin's capacity to adsorb sulfuric acid will be exhausted upon treating less than an equal volume of sulfuric acid solution 10. The ion exchange treated solution exiting the ion exchange apparatus 11 is low in sulfuric acid content but contains nearly all of the iron (III) and other metal ions. The ion exchange-treated solution is collected in a surge tank 40.

Upon exhaustion of the ion exchange apparatus resin's capacity to adsorb sulfuric acid from the sulfuric acid solution 10 containing iron (III) and other metal ions, the feed of sulfuric acid solution 10 to the ion exchange apparatus is stopped and water 14 is fed to the ion exchange apparatus to produce an acid-rich stream 12 and the regenerate the ion exchange resin.

The acid-rich solution 12 is then returned to the copper electro-winning apparatus as makeup acid.

The ion exchange-treated solution 11 low in sulfuric acid content but containing nearly all of the iron (III) and other metal ions contained in surge tank 40 is pumped to a chemical treatment apparatus 50 where an aqueous solution of dilute sodium hydroxide solution 13 is added to raise the pH to a value higher than 2.5 but less than about 4.0 causing the iron (III) to precipitate as solid iron hydroxide. In this embodiment dilute sodium hydroxide solution with a concentration of between 1 and 40 weight % is added in stream 13.

In another embodiment, stream 13 can be comprised of a mild oxidant like hydrogen peroxide with sodium hydroxide with a concentration of between 1 and 40 weight % to cause iron (II) present in the ion exchange-treated solution to simultaneously oxidize to iron (III) and precipitate as iron hydroxide.

In yet another embodiment, stream 13 can be comprised of hydrogen peroxide or another suitable oxidant and sodium hydroxide to cause manganese (II) to precipitate.

The chemical treatment apparatus 50 consists of one or more stirred reactor tanks that allow sufficient residence time to cause the iron (III) to precipitate. Typically the chemical treatment apparatus would consist of one or more tanks with baffles and agitators to allow intimate mixing of the ion exchange-treated solution 11 with the contents of the process stream 13.

In the present embodiment, the solid formed in the chemical treatment apparatus 50 is removed from the solution by filtration, centrifugation, flocculation or sedimentation in waste stream 16 and is discarded. The remaining solution 15 containing copper (II) and cobalt in essentially the same concentration as was present in stream 10 is returned to the copper electro-winning apparatus.

By making this separation, the low-acid salt solution can be processed with standard water treatment technology to selectively remove iron. This is easily done by adding a base such as sodium hydroxide or lime so as to raise the pH of the solution to about 3. If acid removal is not done beforehand, this step is not cost effective because all of the acid present in the copper electrolyte bleed must first be neutralized. The acid content in copper electrolyte bleed is typically on the order of 140–160 grams per liter whereas the acid content in the low-acid bleed is about 5–10 grams per liter.

Following the acid loading cycle, feed is interrupted to the resin bed and water is passed to elute low-salt acid for reuse in the copper electro-winning circuit.

The ion exchange resin's capacity to adsorb acid is quite limited. Normally, the resin's capacity is exhausted when a volume of copper electrolyte bleed representing approximately 40–45% of the volume of the resin column has been passed. For example, if the resin bed has a volume of 100 milliliters only 30–45 milliliters of copper electrolyte bleed solution can be processed before the bed's capacity is exhausted.

Figure 2:
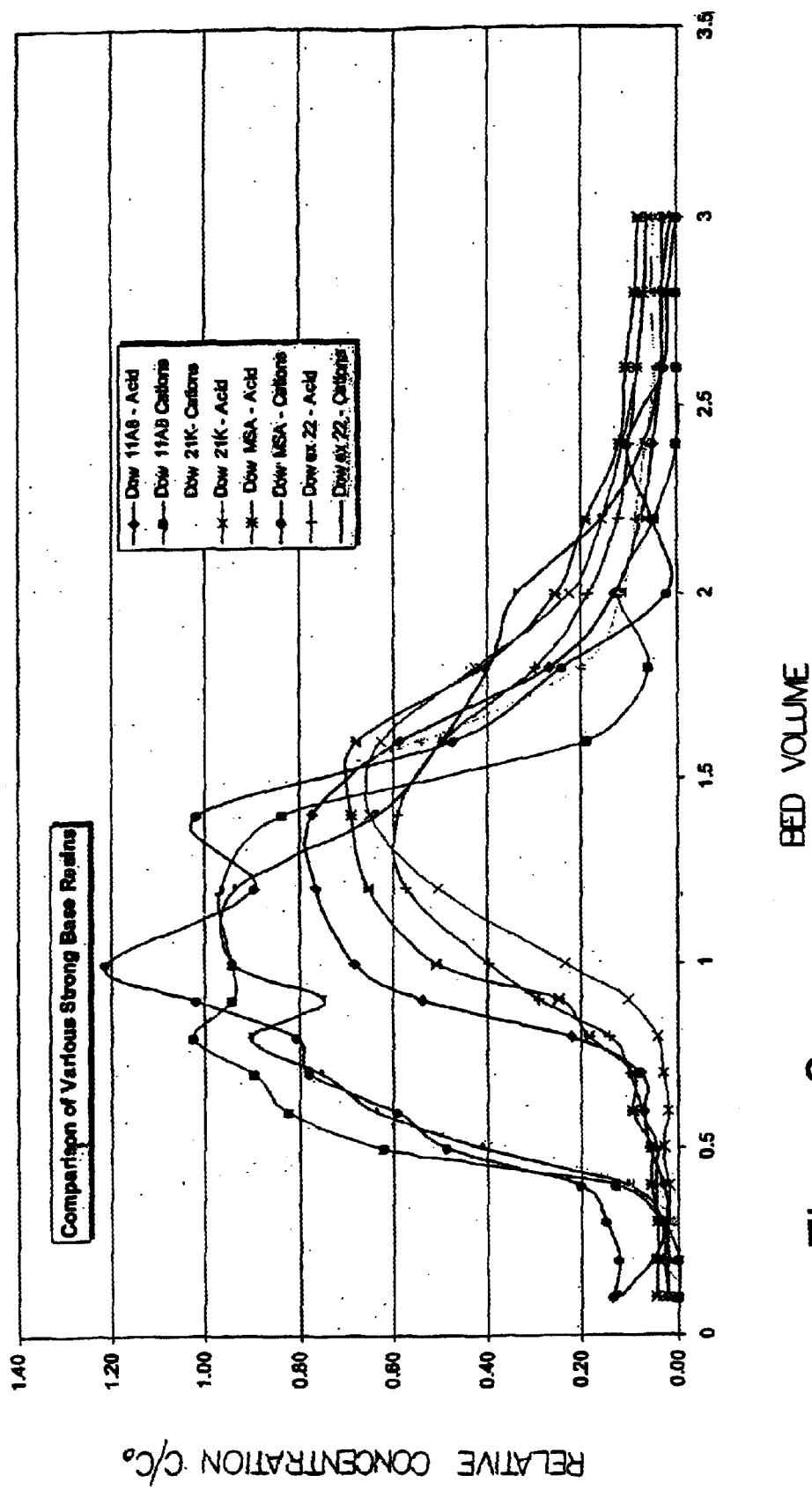
FIG. 2 is a graph comparing a performance of a variety of strong base resins.

The graph of FIG. 2 compares the performance of a variety of strong base resins. The graph was generated by passing one bed volume of synthetic copper electrolyte followed by two bed volumes of water through the bed of ion exchange resin and collecting and analyzing the effluent. The effluent sample was analyzed for free acid by titrating with a standard base. Another portion of the effluent was analyzed for total cations using a method described by Hatch and Dillon, "Acid Retardation a Simple Physical Methods for Separation of Strong Acids from Their Salts", Industrial and Engineering Chemistry Process Design and Development, Volume 2 Number 4, October 1963, pp253–263.

The results are plotted as ratios of the concentration, C, relative to the original concentration, $C_o$.

The synthetic copper electrolyte solution contained 158 g/l sulfuric acid, 41 g/l copper, and 3.65 g/l iron (III).

| Bed Volume | Dow 11A8 | | | | Dow 21KXLT | | | | Dow MSA | | | | Dowex 22 | | | |
|---|---|---|---|---|---|---|---|---|---|---|---|---|---|---|---|---|
| | $H_2SO_4$, g/l | $C/C_o$ | Cations, eq/l | $C/Co$ | $H_2SO_4$, g/l | $C/C_o$ | Cations, eq/l | $C/Co$ | $H_2O_4$, g/l | $C/C_o$ | Cations, eq/l | $C/Co$ | $H_2SO_4$, g/l | $C/C_o$ | Cations, eq/l | $C/Co$ |
| 0.1 | 3.84 | 0.02 | 0.00 | 0.00 | 3.36 | 0.02 | 0.00 | 0.00 | 7.20 | 0.05 | 6.35 | 0.13 | 6.72 | 0.04 | 5.72 | 0.12 |
| 0.2 | 3.84 | 0.02 | 0.00 | 0.00 | 4.80 | 0.03 | 1.59 | 0.03 | 6.72 | 0.04 | 5.72 | 0.12 | 6.72 | 0.04 | 2.54 | 0.05 |
| 0.3 | 3.84 | 0.02 | 1.59 | 0.03 | 2.88 | 0.02 | 0.64 | 0.01 | 6.72 | 0.04 | 6.99 | 0.15 | 6.72 | 0.04 | 1.59 | 0.03 |
| 0.4 | 4.80 | 0.03 | 6.04 | 0.13 | 2.88 | 0.02 | 4.77 | 0.10 | 8.64 | 0.06 | 9.53 | 0.20 | 7.20 | 0.05 | 4.77 | 0.10 |
| 0.5 | 9.12 | 0.06 | 29.39 | 0.62 | 4.80 | 0.03 | 16.20 | 0.34 | 8.64 | 0.06 | 22.87 | 0.48 | 7.20 | 0.05 | 19.38 | 0.41 |
| 0.6 | 10.56 | 0.07 | 38.76 | 0.82 | 2.88 | 0.02 | 33.36 | 0.71 | 14.40 | 0.09 | 27.96 | 0.59 | 11.52 | 0.07 | 29.86 | 0.63 |
| 0.7 | 12.00 | 0.08 | 42.25 | 0.89 | 4.80 | 0.03 | 37.17 | 0.79 | 14.40 | 0.09 | 36.85 | 0.78 | 15.36 | 0.10 | 35.58 | 0.75 |
| 0.8 | 34.56 | 0.22 | 48.29 | 1.02 | 6.72 | 0.04 | 43.21 | 0.91 | 28.80 | 0.19 | 38.12 | 0.81 | 22.08 | 0.14 | 42.57 | 0.90 |
| 0.9 | 83.52 | 0.54 | 44.48 | 0.94 | 16.00 | 0.10 | 47.23 | 1.00 | 38.40 | 0.25 | 47.97 | 1.02 | 45.12 | 0.29 | 35.26 | 0.75 |
| 1 | 106.56 | 0.68 | 44.48 | 0.94 | 36.48 | 0.23 | 49.88 | 1.06 | 79.20 | 0.51 | 57.19 | 1.21 | 61.44 | 0.39 | 44.32 | 0.94 |
| 1.2 | 119.04 | 0.77 | 45.75 | 0.97 | 78.72 | 0.51 | 46.38 | 0.98 | 101.76 | 0.65 | 42.25 | 0.89 | 89.28 | 0.57 | 44.16 | 0.94 |
| 1.4 | 120.00 | 0.77 | 39.39 | 0.83 | 101.28 | 0.65 | 48.29 | 1.02 | 107.52 | 0.69 | 47.97 | 1.02 | 92.16 | 0.59 | 29.86 | 0.63 |
| 1.6 | 91.20 | 0.59 | 8.90 | 0.19 | 97.44 | 0.63 | 25.73 | 0.54 | 105.60 | 0.68 | 22.24 | 0.47 | 77.28 | 0.50 | 23.51 | 0.50 |
| 1.8 | 41.76 | 0.27 | 2.86 | 0.06 | 66.24 | 0.43 | 9.53 | 0.20 | 64.32 | 0.41 | 11.44 | 0.24 | 46.08 | 0.30 | 18.74 | 0.40 |
| 2 | 20.16 | 0.13 | 5.72 | 0.12 | 35.04 | 0.23 | 5.40 | 0.11 | 39.36 | 0.25 | 0.95 | 0.02 | 28.80 | 0.19 | 15.89 | 0.34 |
| 2.2 | 12.00 | 0.08 | 2.22 | 0.05 | 24.00 | 0.15 | 4.13 | 0.09 | 29.76 | 0.19 | 2.54 | 0.05 | 19.20 | 0.12 | 7.41 | 0.16 |
| 2.4 | 7.68 | 0.05 | 0.00 | 0.00 | 17.28 | 0.11 | 3.18 | 0.07 | 18.24 | 0.12 | 4.87 | 0.10 | 15.36 | 0.10 | 3.34 | 0.07 |
| 2.6 | 4.80 | 0.03 | 0.00 | 0.00 | 12.96 | 0.08 | 2.22 | 0.05 | 16.32 | 0.10 | 1.27 | 0.03 | 12.96 | 0.08 | 1.59 | 0.03 |
| 2.8 | 4.80 | 0.03 | 0.00 | 0.00 | 10.56 | 0.07 | 2.54 | 0.05 | 13.44 | 0.09 | 0.95 | 0.02 | 10.08 | 0.06 | 1.59 | 0.03 |
| 3 | 4.80 | 0.03 | 0.00 | 0.00 | 9.12 | 0.06 | 2.22 | 0.05 | 12.48 | 0.08 | 0.00 | 0.00 | 9.60 | 0.06 | 0.64 | 0.01 |

Figure 3:
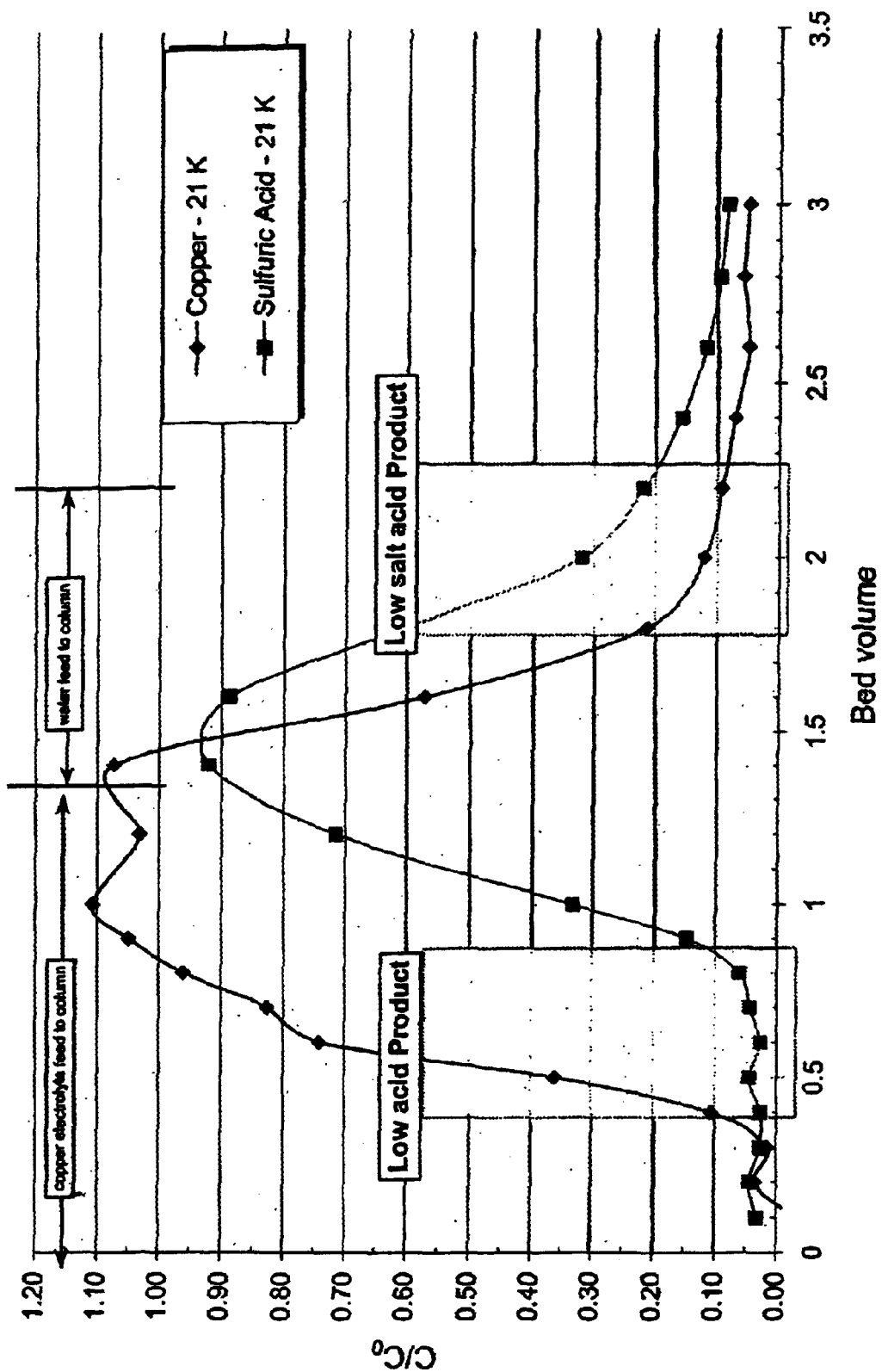
FIG. 3 is a graph showing the individual result for Dow 21 K XLT when treating synthetic copper electrolyte.

The data for the graph is presented in the table above.
The ion exchange resins listed above are all available from Dow Chemical Company, Midland, Michigan. The resins tested include:
Dowex 21K XLT - a Type I strong base gel-type resin
Dowex MSA - a Type I strong base macroporous resin
Dowex 22 - a Type II strong base gel-type resin
Dowex 11A8 - an amphoteric gel-type resin containing both strong base and weak acid cation exchange groups The graph of FIG. 3 shows the individual result for Dow 21 K XLT when treating synthetic copper electrolyte. The low acid product area marked on the graph shows the effluent that would be produced for iron removal. This shaded area represents the effluent collected from bed volume 0.4 to 0.8.

A sample of this effluent was collected and analyzed and found to contain 29 g/l copper, and 1.06 g/l iron (III). The sample was then neutralized with sodium hydroxide until the pH was approximately 3.0 causing the iron to precipitate. A sample of the clear solution was analyzed and found to contain 27.9 g/l copper and 0.146 g/l iron (III) indicating that 86.2% of the iron was removed and only 3.8% of the copper was precipitated.

The area described as Low acid product represents the copper solution containing most of the iron, copper and cobalt but hardly any of the sulfuric acid. This small volume represents about 0.4 bed volumes. This solution would be sent to the iron removal unit operation where the solution pH would be raised to approximately 3.0 with sodium hydroxide causing the iron to precipitate as iron (III) hydroxide. The other area described as the low salt acid product represents the sulfuric acid containing only a small portion of the original copper, iron and cobalt.

While the above method is described in relation to the electro-winning process for copper, other uses of the solid ion exchange medium as described herein for extraction of iron impurities from sulfuric acid mixtures can also be proposed and may form the subject matter of this application.

What is claimed is:

1. A method for the electro-winning of copper comprising:
   providing electrodes in an electrolyte comprising a copper-enriched aqueous solution of a copper sulfate-sulfuric acid mixture containing iron (III) as an impurity and passing current therethrough to effect extraction of copper by electroplating of the copper from the electrolyte;
   the extraction of the copper causing a relative build up in the level of the iron impurity in the electrolyte;
   after extracting copper, removing at least a part of the electrolyte solution;
   removing the iron (III) impurity from the aqueous sulfuric acid electrolyte solution containing the iron impurity by:
      contacting the removed electrolyte solution with an anionic strong base solid ion exchange medium in which the medium binds the sulfuric acid in preference to the iron (III) ions to form a solid/liquid admixture, wherein the ion exchange medium is comprised of an insoluble cross-linked polymer having a plurality of quaternary amine groups (N::) as the exchanging group;
   contacting the electrolyte solution with a sufficient amount of ion exchange particles for a time period required to solid phase-bind the sulfuric acid to leave an aqueous phase containing the iron impurity;
   separating the solid and liquid phase;
   extracting the iron impurity from the liquid phase;
   removing the sulfuric acid from the solid ion exchange medium;
   and returning at least part of the sulfuric acid and the liquid phase after extraction of the iron impurity to the electrolyte solution for further electrolytic plating of the copper.

2. The method according to claim 1 wherein the liquid phase is mixed an acid-neutralizing agent to raise the pH of the liquid phase to a value of at least 2.5 but less than 4.0, causing the iron (III) to form a solid phase iron hydroxide ($Fe(OH)_3$) for separation therefrom.

3. The method according to claim 2 wherein the solid phase iron hydroxide is then separated from the liquid phase and the liquid phase is returned to the electrolyte solution for further copper extraction.

4. The method according to claim 2 wherein the acid neutralizing agent is sodium hydroxide solution.

5. The method according to claim 1 wherein the sulfuric acid is removed from the ion exchange medium by contacting the solid phase-bound sulfuric acid with water thereby forming an aqueous sulfuric acid solution and regenerating the ion exchange medium.

6. The method according to claim 5 wherein the aqueous sulfuric acid solution separated from the ion exchange resin is recycled back to the electrolyte solution.

7. The method according to claim 1 wherein the solid ion exchange medium is provided in the form of particles.

8. The method according to claim 1 wherein the solid ion exchange medium is comprised of a cross-linked copolymer ranging from 4% cross linked to 40% cross linked.

9. The method according to claim 1 wherein the solid ion exchange medium is comprised of a cross-linked copolymer with the preferred cross linking greater than 8%.

10. The method according to claim 1 wherein the solid ion exchange medium is comprised of a cross-linked copolymer present as spherical particles with a diameter of between 0.074 millimeters and 1.0 millimeters.

11. The method according to claim 1 wherein the solid ion exchange medium is comprised of a cross-linked copolymer with the preferred particle size less than 0.297 millimeters.

12. The process according to claim 1 wherein the concentration of sulfuric acid in the removed electrolyte solution is about 1 to 3 molar.

13. The process according to claim 1 where the removed electrolytic solution contains other metal ions from the group consisting of copper (II), manganese (II), cobalt (II) and iron (III).

14. The process according to claim 1 wherein the said aqueous solution of sulfuric acid forming the removed electrolytic solution also contains iron (II) and iron (III) ions.

15. The process according to claim 1 wherein the solid ion exchange medium is provided in a moving bed .

16. The method according to claim 1 wherein the electrolyte solution contains cobalt and the cobalt extracted with the removed electrolyte solution is returned to the electrolyte solution after the iron impurities are removed.

* * * * *